United States Patent [19]

Winnick

[11] E Patent Number: Re. 31,778

[45] Reissued Date of Patent: Dec. 25, 1984

[54] ELECTROCHEMICAL SEPARATION AND CONCENTRATION OF SULFUR CONTAINING GASES FROM GAS MIXTURES

[76] Inventor: Jack Winnick, 3028 Vinings Fy. Dr., Atlanta, Ga. 30339

[21] Appl. No.: 398,748

[22] Filed: Jul. 16, 1982

Related U.S. Patent Documents

Reissue of:

[64] Patent No.: 4,246,081
Issued: Jan. 20, 1981
Appl. No.: 17,064
Filed: Mar. 2, 1979

[51] Int. Cl.[3] ..... C25B 1/02
[52] U.S. Cl. ..... 204/130; 204/61
[58] Field of Search ..... 204/1 F, 60, 61, 130, 204/140; 429/12, 19, 103, 104

[56] References Cited

U.S. PATENT DOCUMENTS

| | | | |
|---|---|---|---|
| 3,316,163 | 4/1967 | Oser | 204/129 |
| 3,400,054 | 9/1968 | Ruka et al. | 204/427 |
| 3,479,261 | 11/1969 | Heredy | 204/61 |
| 3,616,339 | 10/1971 | Marzluff | 204/131 |
| 3,718,546 | 2/1973 | Salzano et al. | 204/1 F |
| 3,727,375 | 4/1973 | Wallace | 204/87 |
| 3,824,163 | 7/1974 | Maget | 204/130 |
| 3,847,672 | 11/1974 | Trocciola et al. | 429/46 |
| 3,855,386 | 12/1974 | Moore | 204/61 |
| 3,933,608 | 1/1976 | Haas et al. | 204/164 |
| 3,944,476 | 3/1976 | Gatellier et al. | 204/140 |

FOREIGN PATENT DOCUMENTS 1040264 10/1978 Canada ..... 204/424

OTHER PUBLICATIONS

Abdel-Salam et al, AIChE Journal, vol. 22, No. 6, "Simulation of an Electrochemical Carbon Dioxide Concentrator", pp. 1042-1050, Nov. 1976.

Winnick et al, Ind. Eng. Chem., vol. 13, No. 1, 1974, "An Electrochemical Device for Carbon Dioxide Concentration. 1. System Design and Performance", pp. 59-70.

Gauthier et al, "Solid State Detectors for the Potentiometric Determination of Gaseous Oxides", J. Electrochem. Soc., (Oct. 1977), pp. 1579-1583.

*Primary Examiner*—T. Tung
*Attorney, Agent, or Firm*—Kokjer, Kircher, Bradley, Wharton, Bowman & Johnson

[57] ABSTRACT

A method of removing sulfur oxides of $H_2S$ from high temperature gas mixtures (150°-1000° C.) is the subject of the present invention. An electrochemical cell is employed. The cell is provided with inert electrodes and an electrolyte which will provide anions compatible with the sulfur containing anions formed at the anode. The electrolyte is also selected to provide inert stable cations at the temperatures encountered. The gas mixture is passed by the cathode where the sulfur gases are converted to $SO_4$= or, in the case of $H_2S$, to S=. The anions migrate to the anode where they are converted to a stable gaseous form at much greater concentration levels (>10X). Current flow may be effected by utilizing an external source of electrical energy or by passing a reducing gas such as hydrogen past the anode.

5 Claims, 1 Drawing Figure

Figure 1:
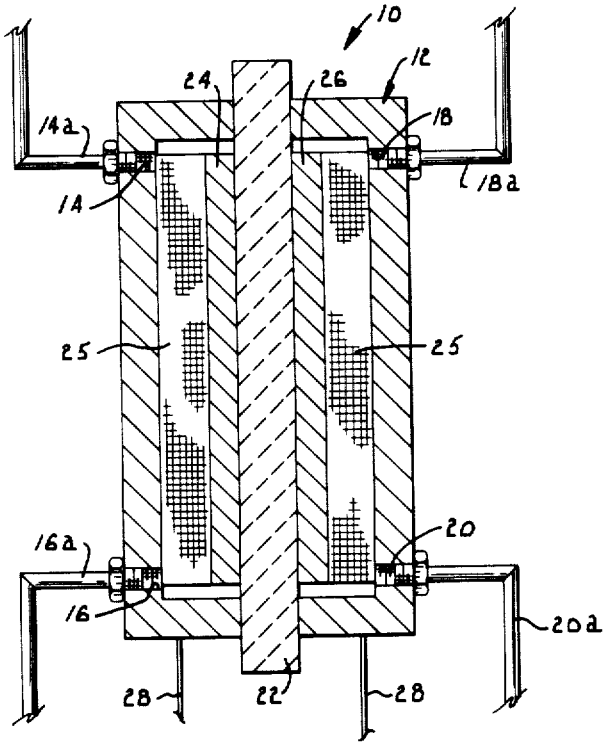

ELECTROCHEMICAL SEPARATION AND CONCENTRATION OF SULFUR CONTAINING GASES FROM GAS MIXTURES

Matter enclosed in heavy brackets [ ] appears in the original patent but forms no part of this reissue specification; matter printed in italics indicates the additions made by reissue.

This invention relates generally to separation of gas mixtures and, more particularly, to a method of removing $H_2S$ and sulfur oxides from a high temperature gas stream.

Electrochemical techniques have heretofore been employed in fuel cells for separation of carbon dioxide from closed environments such as are encountered in space travel. The known processes of the prior art are, however, inoperable at extremely high temperatures, e.g. in the 150° C. to 1000° C. range.

At high temperatures, as commonly encountered in industrial stack gases, the presently accepted technique for removing water soluble gases, such as the sulfur oxides is through water scrubbers. These devices are expensive to install and maintain, normally require chemical additives to improve absorption, and often result in liquid-sludge disposal problems. They also have high energy requirements in that the stack gas must be reheated before release to the environment.

It is therefore a primary object of the present invention to provide an electrochemical process for removal of sulfur containing gases from high temperature gas mixtures.

An important objective of my invention is to provide an electrochemical process for removal of sulfur containing gases from high temperature gas mixtures which is more economical to operate then conventional scrubbers.

An aim of the invention is to provide an electrochemical process for removal of sulfur containing gases from high temperature gas mixtures which is more effective in concentrating the removed gases and converting them into forms more easily stored and sold thereby making recovery of the removed gas more feasible.

It is another object of this invention to provide an electrochemical method for removal of sulfur containing gases from high temperature gas mixtures wherein the problem of sludge disposal associated with scrubbing devices of the prior art is eliminated.

Other objects of the invention will be made clear or become apparent from the following description and claims when read in light of the accompanying drawing wherein the single FIGURE is a schematic illustration of the electrochemical cell which may be utilized to carry out the process of the present invention.

Referring to the drawing, an electrochemical cell is designated generally by the numeral 10. A cell of similar construction has heretofore been used as a molten carbonate fuel cell. Cell 10 comprises a housing 12 having a plurality of ports 14–20 communicating with the exterior of the cell. Conduits 14a–20a are in communication with the respective ports.

Disposed centrally of the cell 10 is an electrolyte tile 22 which holds the electrolyte matrix and the electrolyte material. Tile 22 is preferably formed from a ceramic or other highly porous inert material stable at high temperatures. Located adjacent to and in close contact with tile 22 is the porous cathode of the cell which is designated by the numeral 24. Cathode 24 is held in place by a porous grid 25. The anode of the cell is designated by the numeral 26 and is also in intimate contact with electrolyte tile 22. The anode is held in place by a second porous grid 25.

Lead lines 28 are in electrical contact with the anode and cathode and are coupled with an external source of electrical energy or control.

In coal burning industrial plants and power generating stations the stack gas emanating from the coal furnaces is generally at a temperature in excess of about 150° C. and may be as high as 700° C. Stack gas of this nature will contain less than 1% (by volume) sulfur oxides, principally $SO_2$ which must be removed in order to meet pollution control laws.

The process of the present invention encompasses a method of removing sulfur oxides from stack gas utilizing electrochemical cell 10. To this end, an electrolyte is selected which will provide anions compatible with those formed by the sulfur oxides at the cathode of the cell. Thus in the case of $SO_2$ which undergoes conversion to $SO_4^{--}$ at the cathode, a sulfate salt is selected for the electrolyte. For example, salts having $SO_4^{--}$, $HSO_4^-$ and $S_2O_7^{--}$ anions may be utilized. The electrolyte also needs to be selected with consideration for providing unreactive stable cations at temperatures above 150° C. The alkali metals are particularly applicable because they meet the foregoing criteria and are also readily available. A preferred electrolyte is a eutectic mixture of $K_2SO_4$ (12%) $Na_2SO_4$ (9%) and $Li_2SO_4$ (79%) (molar percentages). Suitable matrices for the electrolyte include MgO and $LiAlO_2$. Other matrix material may be utilized if suitably inert and stable at the high temperature encountered. The eutectic salt specified above has a melting point of approximately 500° C. making it suitable for operating temperatures of approximately 550°–700° C. In the event of conversion of the $SO_4^{--}$ ions of the salt during operation to $HSO_4^-$ or $S_2O_7^{--}$ the melting point and hence the operating temperature may be lowered to about 200°–300° C.

In one form of the invention the current flow between cathode 24 and anode 26 is effected by an external power source (not shown) connected across leads 28. The $SO_2$ containing stack gas is directed into the cell 10 through one of conduits 14a or 16a and exits through other conduit. As the gas comes into intimate contact with cathode 24 the following reactions will take place:

$$SO_2 + \tfrac{1}{2}O_2 \rightarrow SO_3$$

$$\tfrac{1}{2}O_2 + 2e^- \rightarrow O^{--}$$

$$O^{--} + SO_3 \rightarrow SO_4^{--}$$

$HSO_4^-$ and $S_2O_7^{--}$ ions may also be formed. The sulfate ions produced at the cathode migrate to the anode where they are converted according to the following reaction:

$$SO_4^{--} \rightarrow SO_3 \uparrow + O^{--}$$

$$O^{--} \tfrac{1}{2}O_2 + 2e^-$$

Any $HSO_4^-$ and $S_2O_7^{--}$ would also react:

$$HSO_4^- \rightarrow H_2O + SO_3 + e^-$$

$$S_2O_7 \rightarrow 2SO_3 + \tfrac{1}{2}O_2 + 2e^-$$

The end product of the electrolysis process evolves through conduits 18a and 20a for disposal or further processing. The concentrated $SO_3$ gas liberated at the anode can be utilized to manufacture concentrated sulfuric acid. The concentrated gas has been found to be more than ten times the concentration of sulfur oxides in the feed stream. Since the system is operated without the large amounts of water required in scrubbers, operating efficiency is greatly increased over conventional processes and there is no sludge disposal problem.

The electrode material must be selected for its electrical condutivity and inert properties relative to the environment encountered. Nickel may be used for the cathode and stainless steel for the anode, if plated with a noble metal such as gold.

In an alternative operation of the invention process I have found that cell 10 may be changed from a driven to a spontaneous cell. To this end lead lines 28 are simply connected together, bypassing the external current source referred to above or they may be connected through a current controller. Current flow is effected by passing $H_2$ or other reducing gas in through one of conduits 18a and 20a and out through the other. The reactions at the cathode remain as previously described. Partial dissolution of some electrode materials may provide an internal current path which precludes the use of an external current path or control.

The hydrogen gas passing in intimate contact with anode 26 will react with the $SO_4^{--}$ ions as follows:

$$2H_2 + SO_4^{--} \rightarrow SO_2 \uparrow + 2H_2O + 2e^-$$

or $$H_2 + SO_4^{--} \rightarrow SO_2 \uparrow + \tfrac{1}{2}O_2 + H_2O + 2e^-$$

or $$5H_2 + SO_4^{--} \rightarrow 4H_2O + H_2S + 2e^-$$

Again, the end product $SO_2$ (in combination with $H_2O$, $H_2$ and $O_2$) may be used as feed stock for manufacturing concentrated sulfuric acid or may be further reduced to elemental sulfur. Any $H_2S$ may be converted to elemental sulfur and hydrogen with the latter being recycled in the process, if certain anode materials such as $MoS_2$ are used.

The process of the invention may also be utilized to remove $H_2S$ from a gas mixture up to 1000° C. In this case a sulfide salt is selected for the electrolyte with the alkali metals being preferred for the reasons previously discussed. An external power source is utilized in combination with a reducing gas such as $H_2$ at the anode. The $H_2S$ is converted at the cathode to present $S^{--}$ ions which will then be concentrated and re-converted at the anode to either elemental sulfur of $H_2S$. Care must be taken to select electrode materials which will not react with any of the ions or molecules present in the environment.

I claim:

1. A method of removing [sulfur gases] *$SO_2$* from a gas mixture at a temperature of about 150° C. or above, said method comprising the steps of:

providing an electrochemical cell having an inert *gas porous* cathode and an inert anode, *said cathode and anode being held in place in said cell by porous members*;

providing said cell with an electrolyte which is molten at temperatures above about 150° C. selected from the group comprising alkali metal sulfates, alkali metal bisulfates, and alkali metal pyrosulfates;

raising the temperature of said cell to at least 150° C. whereby said electrolyte is in its molten state;

[effecting] *providing an external source of electrical energy to effect* current flow between said cathode and said anode;

directing said gas mixture past said cathode where oxidation of [sulfur] *$SO_2$* occurs and sulfur containing anions are formed which migrate [toward] *from said cathode to* said anode [and are converted] *converting said sulfur containing anions to $SO_3$ at said anode* [to gaseous species] *$SO_3$*, whereby concentrated [sulfur gases are] *$SO_3$ is* evolved at said anode.

2. A method as set forth in claim 1, [wherein said sulfur gases comprise principally $SO_2$ and] wherein said step of directing said gas mixture past said cathode results in the formation of $SO_4^{--}$ ions at the cathode.

[3. A method as set forth in claim 2, wherein said step of providing an electrolyte comprises providing at least one alkali metal salt.]

[4. A method as set forth in claim 2, wherein said step of providing an electrolyte comprises selecting at least one alkali metal salt from the group consisting of $SO_4^{--}$, $HSO_4^-$ and $S_2O_7^{--}$.]

[5. A method as set forth in claim 1, wherein said step of effecting current flow comprises providing an external source of electrical energy across said anode and cathode.]

[6. A method as set forth in claim 1, wherein said step of effecting current flow comprises passing a reducing gas past said anode.]

[7. A method as set forth in claim 6, wherein said step of passing a reducing gas comprises passing hydrogen past said anode.]

[8. A method as set forth in claim 1, wherein said sulfur gases comprise principally $H_2S$ and wherein said step of directing said gas mixture past said cathode results in the formation of $S^{--}$ ions.]

[9. A method as set forth in claim 8, wherein said step of providing an electrolyte comprises providing at least one alkali metal salt.]

[10. A method as set forth in claim 8, wherein said step of providing an electrolyte comprises providing at least one alkali metal sulfide salt.]

[11. A method as set forth in claim 8, wherein said step of effecting current flow comprises providing an external source of electrical energy across said anode and cathode.]

[12. A method as set forth in claim 8, wherein said step of effecting current flow comprises passing a reducing gas past said anode.]

[13. A method as set forth in claim 12, wherein said step of passing a reducing gas comprises passing hydrogen past said anode.]

14. A method of removing [sulfur gases] *$SO_2$* from a gas mixture at a temperature of about 150° C. or above, utilizing an electrochemical cell characterized by an inert anode and an inert [cathode] *gas porous cathode held in place in said cell by porous members* and having an electrolyte which is molten at operating temperatures, said electrolyte being selected from the group comprising alkali metal sulfates, alkali metal bisulfates and alkali metal pyrosulfates, said method comprising the steps of:

raising the temperature of said cell to at least 150° C. whereby said electrolyte is in its molten state;

[effecting] *providing an external source of electrical energy to effect* current flow betwee said cathode and said anode;

directing said gas mixture past said cathode where oxidation of [sulfur] $SO_2$ occurs and sulfur containing anions are formed which migrate [toward] *from said cathode to* said anode [and] *where they* are converted to [gaseous species] $SO_3$, whereby concentrated [sulfur gases are] $SO_3$ *is* evolved at said anode.

15. A method as set forth in claim 14, wherein is included the step of recovering said gas evolving at said anode.

[16. A method as set forth in claim 15, wherein said step of effecting current flow, comprises providing an external source of electrical energy across said anode and cathode.]

[17. A method as set forth in claim 15, wherein said step of effecting current flow comprises passing a reducing gas past said anode.]

18. A method as set forth in claim 14, [wherein said sulfur gases comprise principally $SO_2$ and] wherein said step of directing said gas mixture past said cathode results in the formation of $SO_4^{--}$ ions at said cathode.

[19. A method as set forth in claim 14, wherein said sulfur gases comprise principally $H_2S$ and wherein said step of directing said gas mixture past said cathode results in the formation of $S^{--}$ ions at said cathode.]

* * * * *